United States Patent [19]

Morishita et al.

[11] Patent Number: 4,598,373
[45] Date of Patent: Jul. 1, 1986

[54] CHARGE CONTROL MICROCOMPUTER DEVICE FOR VEHICLE

[75] Inventors: Mitsuharu Morishita; Shinichi Kouge, both of Hyogo, Japan

[73] Assignee: Mitsubishi Denki Kabushiki Kaisha, Tokyo, Japan

[21] Appl. No.: 495,543

[22] Filed: May 17, 1983

[30] Foreign Application Priority Data

May 18, 1982 [JP] Japan ................... 57-85207

[51] Int. Cl.⁴ .................. H02H 7/14; G06F 15/56
[52] U.S. Cl. ..................... 364/424; 364/483; 322/23; 322/25; 320/32; 320/36; 320/43; 324/433; 324/430
[58] Field of Search ............ 364/481, 483, 424, 431.04, 364/431.03; 320/32-34, 36-43, 48, 49, 61, 64, 72; 324/433, 430

[56] References Cited

U.S. PATENT DOCUMENTS

| | | |
|---|---|---|
| 4,191,918 | 3/1980 | Nicholls ................... 320/37 |
| 4,290,109 | 9/1981 | Taniguchi et al. ........... 364/481 |
| 4,308,492 | 12/1981 | Mori et al. ................ 320/35 |
| 4,333,149 | 6/1982 | Taylor et al. .............. 364/481 |
| 4,377,787 | 3/1983 | Kikuoka et al. ............ 324/427 |
| 4,390,841 | 6/1983 | Martin et al. .............. 324/427 |
| 4,418,310 | 11/1983 | Bollinger ................... 320/37 |
| 4,423,378 | 12/1983 | Marino et al. ............. 324/427 |

Primary Examiner—Errol A. Krass
Assistant Examiner—Thomas G. Black
Attorney, Agent, or Firm—Sughrue, Mion, Zinn, Macpeak & Seas

[57] ABSTRACT

A charge control system for a vehicle is provided with a microcomputer which calculates the most suitable battery charging value or voltage regulator set value on the basis of detected engine and charging system parameters. The microcomputer uses parameters such as the charging condition and service life condition of the battery, along with the instantaneous generated voltage, etc., and outputs the calculated set value to the voltage regulator of the charging system.

5 Claims, 1 Drawing Figure

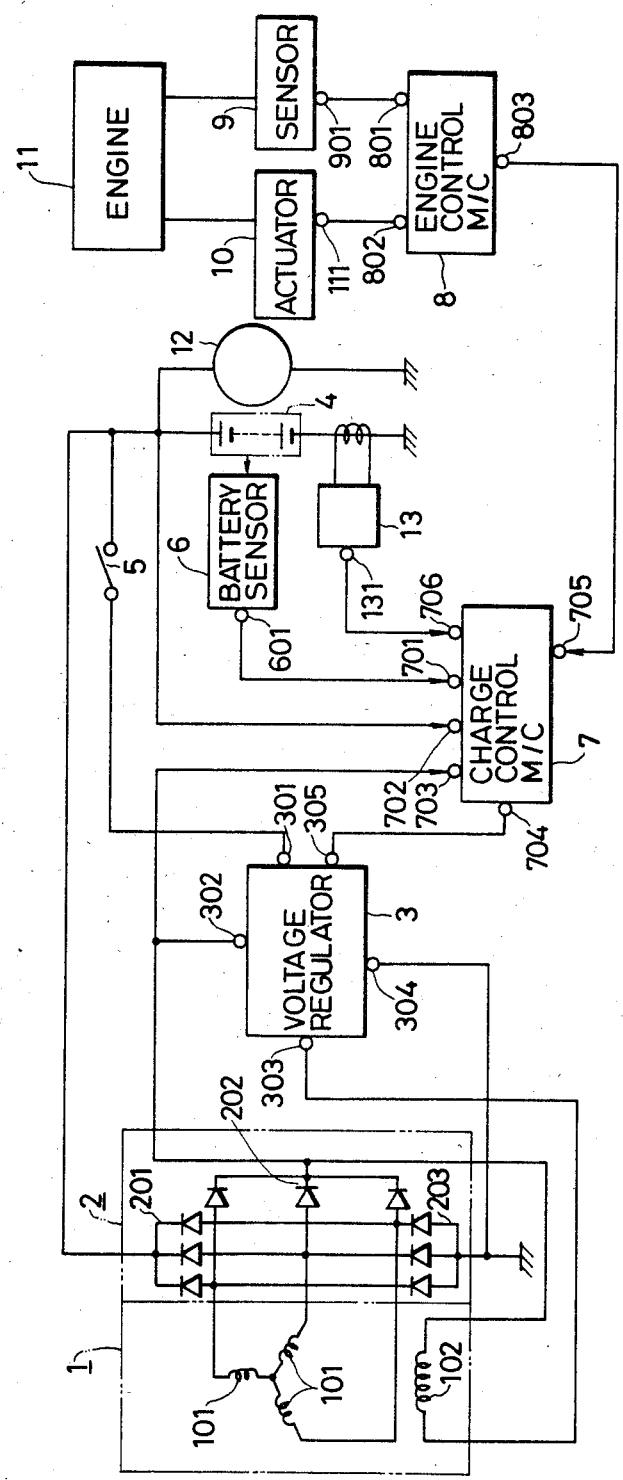

CHARGE CONTROL MICROCOMPUTER DEVICE FOR VEHICLE

BACKGROUND OF THE INVENTION

This invention relates to a charge control microcomputer for a vehicle, which externally determines a voltage control value which is used to control the output voltage of a charging generator driven by an internal combustion engine of a vehicle or the like.

In general, in a conventional device of this type, the output voltage of a generator driven by an internal combustion engine or the like is controlled to a predetermined value which is preset by the voltage regulator installed together with the generator. The output voltage thus controlled charges the vehicle battery. The voltage regulator generally has a temperature compensation characteristic, and the predetermined value thereof is affected by the ambient temperature. That is, the predetermined value is decreased with increasing temperature at a preset negative temperature gradient, so that it is relatively corrected for the battery's charging characteristic temperature gradient.

The generator is installed directly on the engine, while the battery is located on the body side of the engine compartment, and at a corner which is less affected by the engine heat. That is, the generator and the battery are different from each other in their installation locations. In addition, the voltage regulator is much different from the battery in thermal capacity. Therefore, in many cases, it is difficult to maintain the correlation in temperature increase between the voltage regulator and the battery. Thus, the conventional device suffers from a drawback in that it is difficult to effectively correct for the battery's changing charging characteristic according to the temperature increase.

The internal resistance of the battery changes when used for a long time. Accordingly, with a preset temperature compensation characteristic, it is difficult to maintain a predetermined voltage value best for the travelling pattern of the vehicle.

SUMMARY OF THE INVENTION

An object of this invention is thus to provide a charge control microcomputer system for a vehicle, in which the above-described difficulties have been eliminated.

BRIEF DESCRIPTION OF THE DRAWING

The single FIGURE in the accompanying drawing is a circuit diagram showing one example of a charge control microcomputer according to this invention.

DETAILED DESCRIPTION OF THE PREFERRED EMBODIMENT

One example of the charge control microcomputer will now be described with reference to the single FIGURE in the accompanying drawing. In this FIGURE, reference numeral 1 designates a three-phase AC generator driven by an internal combustion engine installed on a vehicle or the like, the generator having three-phase star-connected armature coils 101 and a field coil 102; 2, a full-wave rectifier for subjecting the AC output of the generator 1 to full-wave rectification, the rectifier having first, second and third rectifier output terminals 201, 202 and 203; 3, a voltage regulator for controlling a field current flowing in the field coil 102, to control the output voltage of the generator 1 to a predetermined value; 301, an initial excitation terminal; 302, a voltage detection terminal connected to the second rectifier output terminal 202; 303, a field current input terminal; 304, a ground terminal; 305, an external control input terminal; 4, a battery; 5, a key switch; 6, a battery sensor having an electrical signal output terminal; 7, a charge control microcomputer for processing battery sensor data from the battery sensor 6 and engine data from an engine controlling microcomputer 8 (described later); 701, a battery sensor data input terminal; 702, a battery terminal voltage data input terminal; 703, a generated voltage data input terminal; 704, a reference voltage signal output terminal through which an external control reference voltage signal is applied to the external control terminal 305 of the voltage regulator 3; and 705, an engine signal input terminal. The battery sensor 6 may detect one or more of the solution temperature, specific gravity or acidity of the battery.

Further in the FIGURE, reference numeral 8 designates the aforementioned engine controlling microcomputer; 801, an input terminal for receiving a signal from a sensor 9 (described later); 802, an engine control signal output terminal; 803, an engine data output terminal connected to the charge control microcomputer 7; 9, the aforementioned sensor for detecting the conditions of the engine 11, to apply engine data to the microcomputer 8; 901, a sensor signal output terminal; 10, an actuator for mechanically driving a part of the engine 11; 111, a control signal input terminal; 12, a starter motor which is driven by the battery 4, to start the internal combustion engine 11, 13, a charge-discharge current sensor for detecting the charge or discharge current of the battery 4; and 131, an electrical signal output terminal. The sensor 9 may detect one or more of the intake gas temperature, r.p.m., crank angle, exhaust gas temperature or air-fuel ratio of the engine.

The operation of the device of the invention, which is arranged as described above, will now be described.

When the engine 11 is started, first the key switch 5 is turned on. As a result, a circuit consisting of the battery 4, the key switch 5, the initial excitation terrminal 301 of the voltage regulator 3, the voltage detection terminal 302, the field coil 102, the field coil terminal 303 and the ground terminal 304 is completed, so that an initial excitation current flows in the field coil 102 and an field magnetomotive force is generated therein. In this operation, the voltage of the battery is applied through the key switch 5 to the microcomputers 7 and 8 and, when necessary, to the sensors 6, 9 and 13 and the actuator 10, to enable these circuit elements. In this operation, data on the engine (engine parameters) are detected by the sensor 9, and converted into an electrical signal. The electrical signal is applied through the output terminal 901 to the sensor signal input terminal 801 of the engine controlling microcomputer 8, where it is processed. As a result, the microcomputer 8 provides a control signal at the signal output terminal 802, which provides the best conditions for the starting of the engine. The control signal is applied to the input terminal 111 of the actuator 10. As a result, the actuator is operated, so that the engine 11 is placed in the best condition for starting. At the same time, the microcomputer 8 outputs, among the data from the sensor 9, only that data necessary for the processing of the charge control microcomputer 7, either as it is, or after processing it. The charge control microcomputer 7 processes the engine data, battery terminal voltage data, the generated voltage data, the battery sensor data and the charge-discharge current data which are received through the input terminals 705, 702, 703, 701 and 706, respectively, so as to apply a reference voltage signal to the terminal 305, which determines the set value for the voltage regulator 3, which value should be best for starting the engine. This signal is applied to the input terminal 305, so that the voltage regulator 3 changes the set value to the value which is best for starting the engine. When, under this condition, the starter motor is operated, a large discharge current flows. In this case, the battery sensor data and the battery terminal voltage data are applied to the microcomputer 7. As a result, the microcomputer calculates the internal resistance of the battery 4, estimates the discharge condition and service life condition of the battery, and stores these data in the memory unit thereof.

When the engine is started to drive the generator, an AC output is induced in the armature coils 101 according to the speed of the rotation of the generator 1. The output of the generator 1 is subjected to full-wave rectification by the full-wave rectifier 2, and the output of the latter is charged through the first rectifier output terminal 201 into the battery 4. In this operation, the microcomputer 7 provides a reference voltage signal at the output terminal 704 according to data provided by reading the charge condition and service life condition of the battery which have been detected and stored in the memory unit of the microcomputer 7, the generated voltage data at that time instant, the battery terminal data, the battery sensor data and the charge-discharge current data or an integrated charge-discharge current data obtained by processing the charge-discharge current data, and the engine data. The reference voltage signal is applied to the external control terminal 305 of the voltage regulator, so that the control voltage is set to a value which is calculated from the above-described various data so as to be best for charging the battery 4.

As described above in detail, in the device of the invention, the battery sensor data, the charge-discharge current data, the battery terminal voltage data, the generated voltage data and the engine data are inputted to the charge control microcomputer, and these data are calculated, stored and read out, so that the reference voltage is outputted in agreement with the charge and service life conditions of the battery. Thus, the control voltage of the voltage regulator can be set to a value which is most suitable for the charging of the battery.

In the above-described example of the device, the generated voltage data is obtained at the second rectifier output terminal 202, however, it may be obtained at a one-phase output terminal or the neutral point of the armature coils 101.

What is claimed is:

1. A charge control microcomputer device for a vehicle, comprising:
    an AC generator driven by an internal combustion engine installed on a vehicle, said generator having a field coil and armature coils;
    a battery charged by a rectified output of said generator;
    a starter motor driven by said battery, for starting said engine;
    a voltage regulator for controlling the current flowing in said field coil, to control an output voltage of said generator to a predetermined value;
    a battery sensor for detecting at least one of a solution temperature, specific gravity or acidity of said battery;
    a charge-discharge current sensor for detecting a charge or discharge current of said battery;
    an engine controlling microcomputer for processing engine data; and
    a charge controlling microcomputer for processing, storing and reading data from said battery sensor, data from said charge-discharge current sensor, generated voltage data from said generator, battery terminal voltage data, and engine data from said engine controlling microcomputer, to produce a reference voltage signal to provide said predetermined value for said voltage regulator.

2. A device as claimed in claim 1, said charge control microcomputer calculating an internal resistance of said battery, and estimating the discharging condition and service life condition of said battery on the basis of at least said battery sensor data and said battery terminal voltage data at the beginning of the operation of said engine and storing said calculated and estimated data in a memory thereof.

3. A device as claimed in claim 2, said charge control microcomputer calculating said predetermined value for said voltage regulator during operation of said engine on the basis of at least said stored estimated discharge and service life condition of said battery, an instantaneous generated voltage data, said battery terminal data, battery sensor data, charge-discharge current data and said engine data.

4. A device as claimed in claim 3, said charge-discharge current data comprising an integrated data value.

5. A device as claimed in claim 3, said engine data comprising engine parameter data processed by said engine controlling microcomputer.

* * * * *